US011196813B2

(12) United States Patent
Onishi et al.

(10) Patent No.: US 11,196,813 B2
(45) Date of Patent: Dec. 7, 2021

(54) EXECUTION CONTROL METHOD AND INFORMATION PROCESSING APPARATUS

(71) Applicant: FUJITSU LIMITED, Kawasaki (JP)

(72) Inventors: Takafumi Onishi, Kawasaki (JP); Yasuhiko Kanemasa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/155,127

(22) Filed: Jan. 22, 2021

(65) Prior Publication Data

US 2021/0281645 A1 Sep. 9, 2021

(30) Foreign Application Priority Data

Mar. 9, 2020 (JP) ............................ JP2020-040068

(51) Int. Cl.
*H04L 29/08* (2006.01)
*G16Y 30/00* (2020.01)

(52) U.S. Cl.
CPC ............. *H04L 67/12* (2013.01); *G16Y 30/00* (2020.01)

(58) Field of Classification Search
None
See application file for complete search history.

(56) References Cited

U.S. PATENT DOCUMENTS 10,555,202 B1 * 2/2020 Narayanan ............ H04W 24/10
2010/0106710 A1 4/2010 Nishizawa et al.
2010/0262862 A1 10/2010 Watanabe et al.
2014/0222813 A1 * 8/2014 Yang ...................... G06F 16/95 707/736
2017/0177546 A1 * 6/2017 Heinz .................... G06N 20/00
2017/0195424 A1 * 7/2017 Nasir ..................... H04L 67/36
2018/0013831 A1 * 1/2018 Dey ....................... G08B 25/08
2018/0123820 A1 * 5/2018 Kim ....................... G06F 16/27
2018/0173184 A1 * 6/2018 Kienzle ................ G05B 19/042
2018/0268050 A1 * 9/2018 Kotorov ................ G06F 16/248
(Continued)

FOREIGN PATENT DOCUMENTS

JP 2010-108073 A 5/2010
JP 2010-244486 A 10/2010
(Continued)

OTHER PUBLICATIONS

Extended European Search Report dated Jun. 28, 2021 for corresponding European Patent Application No. 21152275.0, 9 pages.

*Primary Examiner* — Backhean Tiv
(74) *Attorney, Agent, or Firm* — Fujitsu Patent Center

(57) ABSTRACT

An execution control method that causes a computer to execute a process, the process includes generating a first regression line that indicates a correlation between a reception time point of each of a plurality of event messages received in a first time period and a generation time point of each of the plurality of event messages, calculating, for each of the plurality of the event messages, a first difference between the generation time point of each event message and a value on the first regression line corresponding to the reception time point of each event message, and determining, based on a margin time in accordance with the calculated first difference, a notification time point to be added to a control message indicating a communication state of the plurality of event messages.

15 Claims, 21 Drawing Sheets

(56) References Cited

U.S. PATENT DOCUMENTS

| | | | | |
|---|---|---|---|---|
| 2018/0357604 | A1* | 12/2018 | Li | G08C 19/00 |
| 2019/0012319 | A1* | 1/2019 | Zhu | G06F 16/24578 |
| 2019/0064004 | A1* | 2/2019 | Brady | G01K 7/01 |
| 2019/0108669 | A1* | 4/2019 | Burgett | G06T 13/80 |
| 2019/0215256 | A1* | 7/2019 | Dhanabalan | G06N 5/04 |
| 2019/0259041 | A1* | 8/2019 | Jackson | G06F 16/288 |
| 2019/0260830 | A1* | 8/2019 | Karjee | H04L 43/0823 |
| 2019/0392162 | A1* | 12/2019 | Stern | G06F 21/6218 |
| 2020/0259710 | A1* | 8/2020 | Muniyan | G06F 16/2474 |
| 2020/0387917 | A1* | 12/2020 | Trim | G06N 5/045 |
| 2021/0215787 | A1* | 7/2021 | Anvari | G16H 10/60 |
| 2021/0281645 | A1* | 9/2021 | Onishi | H04L 67/12 |

FOREIGN PATENT DOCUMENTS

| | | | |
|---|---|---|---|
| JP | 2011-8629 | A | 1/2011 |
| WO | 2007/009458 | A2 | 1/2007 |

* cited by examiner 10
3a
IoT DEVICE
3b
IoT DEVICE
3c
IoT DEVICE
3d
IoT DEVICE
3e
IoT DEVICE
2
MESSAGE DISTRIBUTION DEVICE
2a
MESSAGE QUEUE
1a
INFORMATION PROCESSING APPARATUS
1b
INFORMATION PROCESSING APPARATUS
1c
INFORMATION PROCESSING APPARATUS

| NO. | GENERATION TIME POINT | RECEPTION TIME POINT | DIFFERENCE (SEC) |
|---|---|---|---|
| 1 | 11:59:00 | 11:59:05 | 1 |
| 2 | 11:59:01 | 11:59:04 | -1 |
| 3 | 11:59:01 | 11:59:09 | 4 |
| 4 | 11:59:02 | 11:59:13 | 7 |
| 5 | 11:59:04 | 11:59:05 | -3 |
| ... | ... | ... | ... |

| NO. | GENERATION TIME POINT | RECEPTION TIME POINT |
|---|---|---|
| 1 | 11:50:34 | 11:50:35 |
| 2 | 11:51:28 | 11:51:31 |
| 3 | 11:52:34 | 11:52:32 |
| 4 | 11:53:31 | 11:53:34 |
| 5 | 11:54:36 | 11:54:43 |
| ... | ... | ... |

EXECUTION CONTROL METHOD AND INFORMATION PROCESSING APPARATUS

CROSS-REFERENCE TO RELATED APPLICATION

This application is based upon and claims the benefit of priority of the prior Japanese Patent Application No. 2020-40068, filed on Mar. 9, 2020, the entire contents of which are incorporated herein by reference.

FIELD

The embodiment discussed herein is related to an execution control method and an information processing apparatus.

BACKGROUND

For example, an entity that provides a service to users (hereafter also referred to simply as an entity) constructs a business system used for providing the service. For example, an entity constructs a business system for providing low latency execution of stream processing for a large number of Internet of things (IoT) data sets generated at a high frequency. In such business systems, for example, processes depending on the order of generation of IoT data sets, such as processes of billing and anomaly detection, are executed.

The order of arrival of such IoT data sets as mentioned above may differ from the order of generation of the IoT data sets, depending on the path of a network between an IoT device for sending the IoT data sets and a business system, the delay state, and so on. Therefore, for example, the business system may wait for arrival of a delayed IoT data set and, after the arrival, perform processing of each IoT data set.

For example, the business system identifies, among IoT data sets arrived in a given time period, an IoT data set generated at the latest time point (the newest IoT data set). The business system identifies, as a reference time point, for example, a time point that is a predetermined margin time earlier than the time point at which the identified IoT data set was generated (the generation time point of the identified IoT data set). The business system then performs processing of, among IoT data sets that have arrived, an IoT data set generated at a time point earlier than the reference time point.

This enables the business system to cause the generation order of IoT data sets to match the processing order of the IoT data sets even when there is an IoT data set that is delayed in arriving because of a network delay or the like (see, for example, Japanese Laid-open Patent Publication No. 2010-108073).

SUMMARY

According to an aspect of the embodiments, an execution control method that causes a computer to execute a process, the process includes generating a first regression line that indicates a correlation between a reception time point of each of a plurality of event messages received in a first time period and a generation time point of each of the plurality of event messages, calculating, for each of the plurality of the event messages, a first difference between the generation time point of each event message and a value on the first regression line corresponding to the reception time point of each event message, and determining, based on a margin time in accordance with the calculated first difference, a notification time point to be added to a control message indicating a communication state of the plurality of event messages.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 18 is a diagram depicting a specific example of difference information;

FIG. 19 is a diagram depicting a specific example of average value information;

DESCRIPTION OF EMBODIMENTS

Setting the margin time mentioned above to a long time enables processing in the business system to be performed more in accordance with the generation order of IoT data sets, while increasing the possibility that the processing completion time will be delayed. In contrast, setting the margin time to a short time enables the delay in the processing completion time in the business system to be reduced, while increasing the possibility that the generation order of IoT data sets will differ from the processing order of the IoT data sets. Therefore, it may be hard for the entity to determine a suitable margin time.

In the business system as described above, the delay time of an IoT data set greatly varies depending on a situation in which delay has occurred in a network, whether a failure has occurred, and so on. It is therefore desirable that such a margin time period as described above be determined as occasion arises in accordance with a situation in which delay has occurred in a network, and so on (the state of arrival of an IoT data set).

With reference to the accompanying drawings, an embodiment of techniques for enabling processing to be performed based on a margin time determined in accordance with a communication state will be described in detail below.

[Configuration of Information Processing System]

Figure 1:
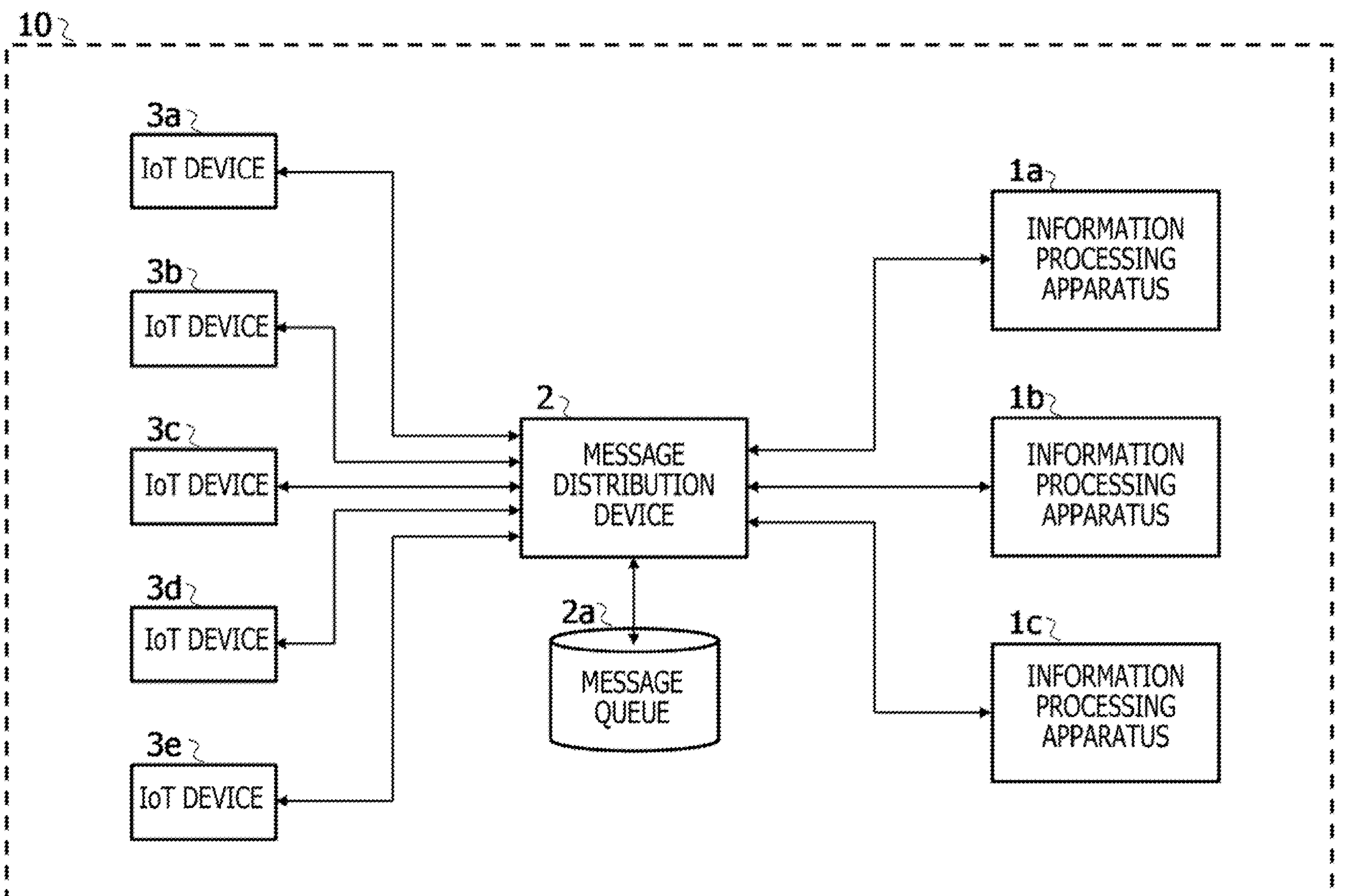
FIG. 1 is a diagram illustrating a configuration of an information processing system.

The configuration of an information processing system 10 will first be described. FIG. 1 is a diagram illustrating a configuration of the information processing system 10.

The information processing system 10 illustrated in FIG. 1 includes an information processing apparatus 1*a*, an information processing apparatus 1*b*, an information processing apparatus 1*c*, a message distribution device 2, an IoT device 3*a*, an IoT device 3*b*, an IoT device 3*c*, an IoT device 3*d*, and an IoT device 3*e*. Hereafter, the information processing apparatuses 1*a*, 1*b*, and 1*c* are also collectively referred to simply as information processing apparatuses 1 (not illustrated in the drawings). The IoT devices 3*a*, 3*b*, 3*c*, 3*d*, and 3*e* are also collectively referred to simply as IoT devices 3 (not illustrated in the drawings).

The IoT device 3 (not illustrated in the drawings) is, for example, an IoT device mounted on a vehicle (not illustrated) and generates a message (hereafter also referred to as an event message) including the position, velocity, operation log, and the like of each vehicle once a given amount of time (for example, once per second). The IoT device 3 sends the generated event message to the message distribution device 2.

The message distribution device 2 stores event messages received from the IoT devices 3 in a message queue 2*a*. The message distribution device 2 sends and distributes the event messages stored in the message queue 2*a* to the information processing apparatuses 1.

For example, the message distribution device 2 references attribute information (for example, information indicating the type of a vehicle loaded with the IoT device 3 that has sent each event message, the road on which the vehicle is running, and the like) included in each event message stored in the message queue 2*a* and identifies the information processing apparatus 1 to which to send each event message (for example, the information processing apparatus 1 that will perform processing corresponding to each event message). The message distribution device 2 sends each event message to the information processing apparatus 1 (not illustrated in the drawings) to which to send the event message.

For example, the message distribution device 2 sends each event message to the information processing apparatus 1 to which to send the event message, so that the numbers of event messages sent to the information processing apparatuses 1 are equalized.

The information processing apparatuses 1 perform processing used for the event messages sent from the message distribution device 2. For example, each information processing apparatus 1 performs processing for the event messages in a distributed manner. The information processing apparatus 1, for example, outputs results of processing performed for the event messages to an output device (not illustrated).

Description will be given below of the case where the information processing system 10 includes five IoT devices 3 (IoT devices 3*a*, 3*b*, 3*c*, 3*d*, and 3*e*). However, the information processing system 10 may include another number of IoT devices 3. For example, the information processing system 10 may include about a million IoT devices 3. Description will be given below of the case where the information processing system 10 includes three information processing apparatuses 1 (information processing apparatuses 1*a*, 1*b*, and 1*c*). However, the information processing system 10 may include another number of information processing apparatuses 1. The outline of functions of the information processing apparatus 1 will be described below.

[Outline of Functions of Information Processing Apparatus]

Figure 2:
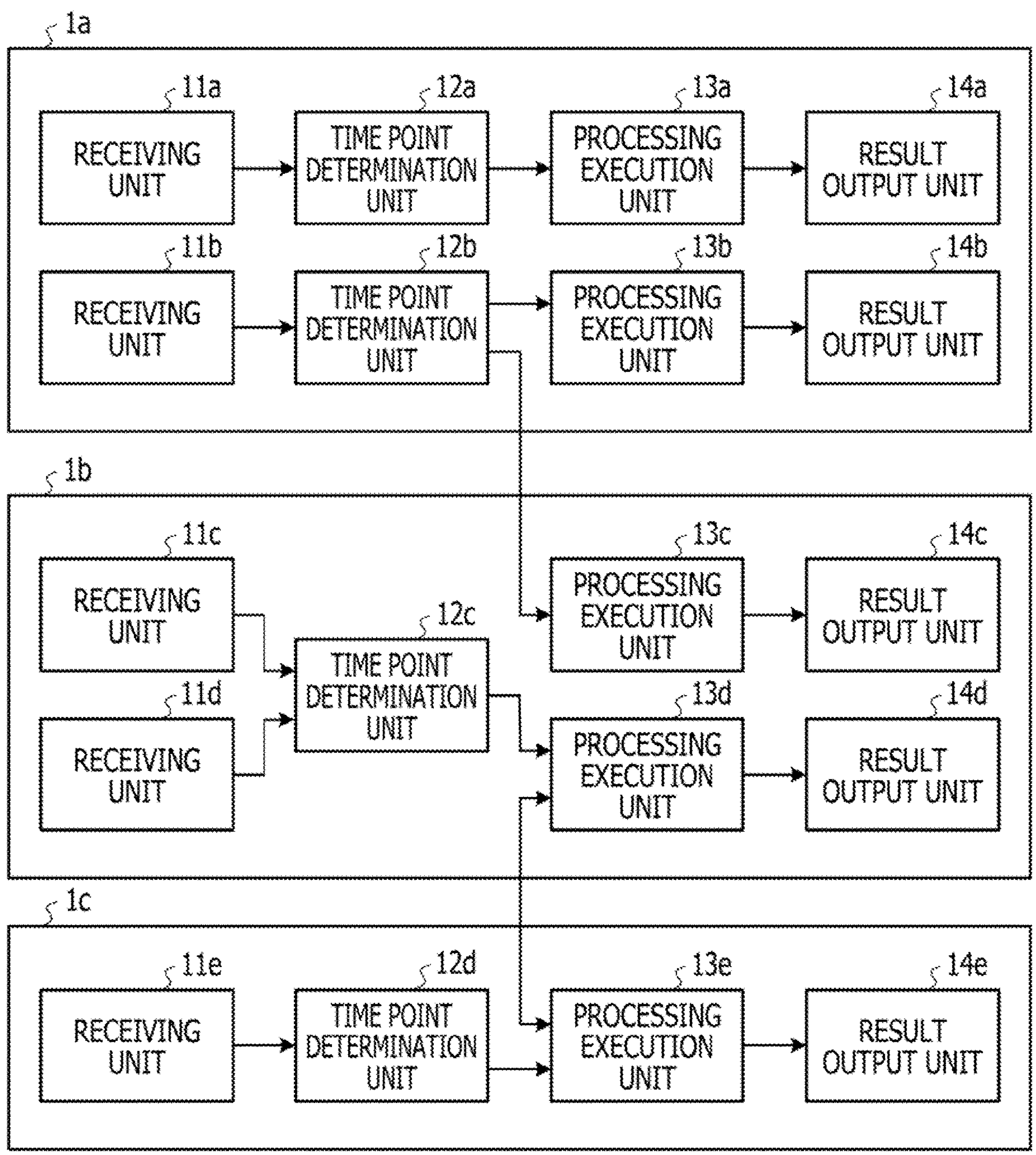
FIG. 2 is a diagram illustrating an outline of functions of an information processing apparatus.

FIG. 2 is a diagram illustrating an outline of functions of the information processing apparatus 1.

In the example illustrated in FIG. 2, the information processing apparatus 1*a* includes a receiving unit 11*a* that receives event messages sent by the message distribution device 2, a time point determination unit 12*a* that determines a margin time for each event message received by the receiving unit 11*a*, a processing execution unit 13*a* that performs processing corresponding to each event message received by the receiving unit 11*a*, and a result output unit 14*a* that outputs an execution result of processing performed by the processing execution unit 13*a*. The information processing apparatus 1*a* includes a receiving unit 11*b* that receives event messages sent by the message distribution device 2, a time point determination unit 12*b* that determines a margin time for each event message received by the receiving unit 11*b*, a processing execution unit 13*b* that performs processing corresponding to each event message received by the receiving unit 11*b*, and a result output unit 14*b* that outputs an execution result of processing performed by the processing execution unit 13*b*.

In the example illustrated in FIG. 2, the information processing apparatus 1*b* includes a processing execution unit 13*c* that performs processing corresponding to each event message received by the receiving unit 11*b*, and a result output unit 14*c* that outputs an execution result of processing performed by the processing execution unit 13*c*. The information processing apparatus 1*b* also includes a receiving unit 11*c* and a receiving unit 11*d* that receive event messages sent by the message distribution device 2, a time point determination unit 12*c* that determines a margin time for each of the event messages received by the receiving unit 11*c* and the receiving unit 11*d*, a processing execution unit 13*d* that performs processing corresponding to each of the event messages received by the receiving unit 11*c*, receiving unit 11*d*, and a receiving unit 11*e*, which will be described later, and a result output unit 14*d* that outputs an execution result of processing performed by the processing execution unit 13*d*.

In the example illustrated in FIG. 2, the information processing apparatus 1*c* includes a receiving unit 11*e* that receives event messages sent by the message distribution device 2, a time point determination unit 12*d* that determines a margin time for each event message received by the receiving unit 11*e*, a processing execution unit 13*e* that performs processing corresponding to each of the event messages received by the receiving unit 11*e*, and a result output unit 14*e* that outputs an execution result of processing performed by the processing execution unit 13*e*.

Hereafter, the receiving units 11*a*, 11*b*, 11*c*, 11*d*, and 11*e* are also collectively referred to as receiving units 11 (not illustrated in the drawings), and the time point determination units 12*a*, 12*b*, 12*c*, and 12*d* are also collectively referred to as time point determination units 12 (not Illustrated in the drawings). Hereafter, the processing execution units 13*a*, 13*b*, 13*c*, 13*d*, and 13*e* are also collectively referred to as processing execution units 13 (not illustrated in the drawings), and the result output units 14*a*, 14*b*, 14*c*, 14*d*, and 14*e* are also collectively referred to as result output units 14 (not illustrated in the drawings).

In the example illustrated in FIG. 2, each of the processing execution units 13 may include a plurality of processing execution units. Each of the processing execution units 13 may perform processing for an event message sent from each of the time point determination units 12 such that the processing is performed by one or more processing execution units among the plurality of processing execution units. For example, each of the processing execution units 13 may perform processing for each event message such that the processing is performed by one or more processing execution units corresponding to the attribute information of each event message among the plurality of processing execution units.

[Outline of Processing in Time Point Determination Unit]

The outline of processing in the time point determination unit 12 will now be described. FIG. 3 to FIG. 8 are diagrams illustrating the outline of processing in the time point determination unit 12. Description will be given below assuming that the margin time is 10 seconds.

Figure 3:
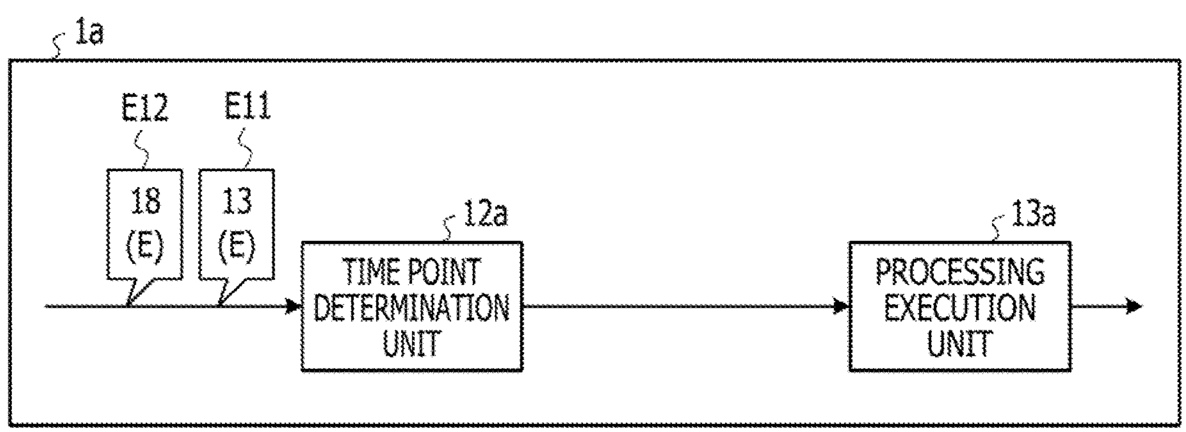
FIG. 3 is a diagram illustrating an outline of processing in a time point determination unit.

For example, as illustrated in FIG. 3, an event message with a timestamp "13 sec" (hereafter also referred to as an event message E11) and an event message with a timestamp "18 sec" (hereafter also referred to as an event message E12) are generated within a given amount of time (for example, 1 sec), the time point determination unit 12*a* specifies the event message E12, which is the later of the event message E11 and the event message E12. In this case, the time point determination unit 12*a* subtracts the margin time from "18 sec", which is the timestamp of the specified event message E12, and obtains "8 sec".

Figure 4:
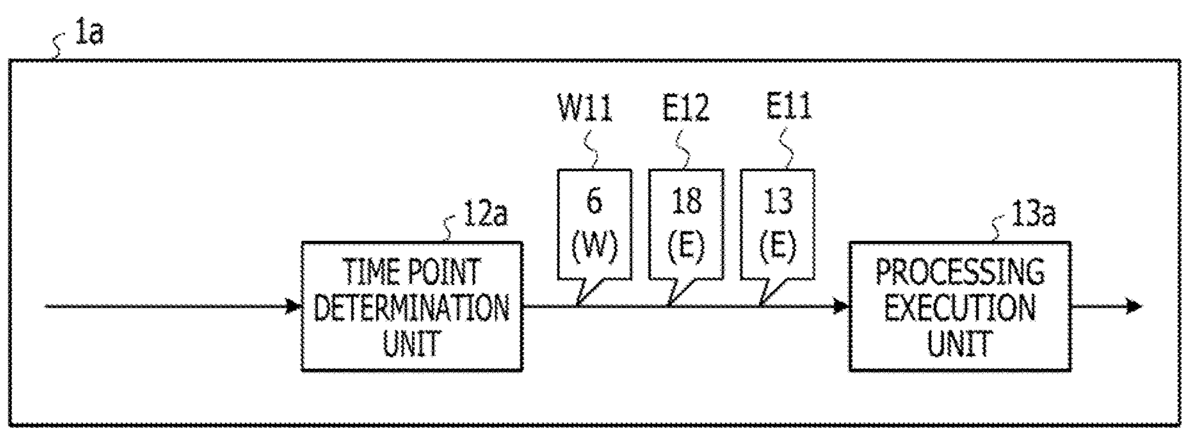
FIG. 4 is a diagram illustrating an outline of processing in the time point determination unit.

Then, as illustrated in FIG. 4, for example, after sending the event message E11 and the event message E12 to the processing execution unit 13*a*, the time point determination unit 12*a* sends a control message (watermark) W11 with a timestamp "8 sec" to the processing execution unit 13*a*.

When the processing execution unit 13*a* receives an event message from the time point determination unit 12*a*, the processing execution unit 13*a* stores the received event message in a buffer (not illustrated). In the case where the processing execution unit 13*a* receives the control message W11 with the timestamp "8 sec" from the time point determination unit 12*a*, the time point determination unit 12*a* performs processing for an event message with a timestamp earlier than "8 sec" among event messages (for which processing has not been performed) stored in the buffer.

For example, the timestamp of the control message W11 is a timestamp calculated by subtracting the margin time from the timestamp of an event message generated in the given amount of time. Therefore, the processing execution unit 13*a*, which has received the control message W11 from the time point determination unit 12*a*, determines that there is a very little likelihood that an event message with a timestamp earlier than "8 sec" will be generated (the likelihood that such an event message will be sent from the time point determination unit 12*a*), and starts processing for an event message with a timestamp earlier than "8 sec" among event messages stored in the buffer.

Thus, the information processing apparatus 1*a* may perform processing without failing to obtain event messages generated in the IoT devices 3.

Figure 5:
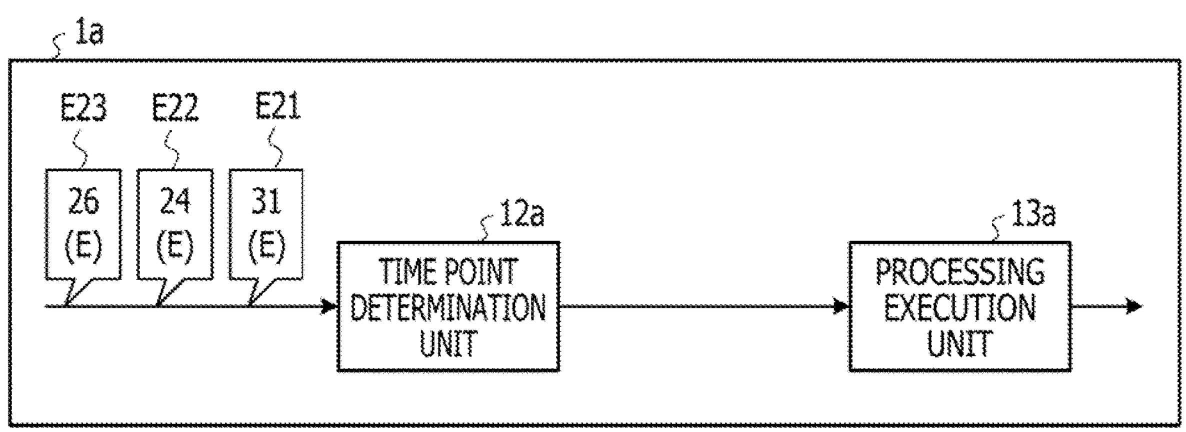
FIG. 5 is a diagram illustrating an outline of processing in the time point determination unit.

Subsequently, for example, as illustrated in FIG. 5, an event message with a timestamp "31 sec" (hereafter also referred to as an event message E21), an event message with a timestamp "24 sec" (hereafter also referred to as an event message E22), and an event message with a timestamp "26 sec" (hereafter also referred to as an event message E23) are generated in the next given amount of time, the time point determination unit 12*a* specifies the event message E21, which is the latest of the event message E21, the event message E22, and the event message E23. In this case, the time point determination unit 12*a* subtracts the margin time from "31 sec", which is the timestamp of the specified event message E21, and obtains "21 sec".

Figure 6:
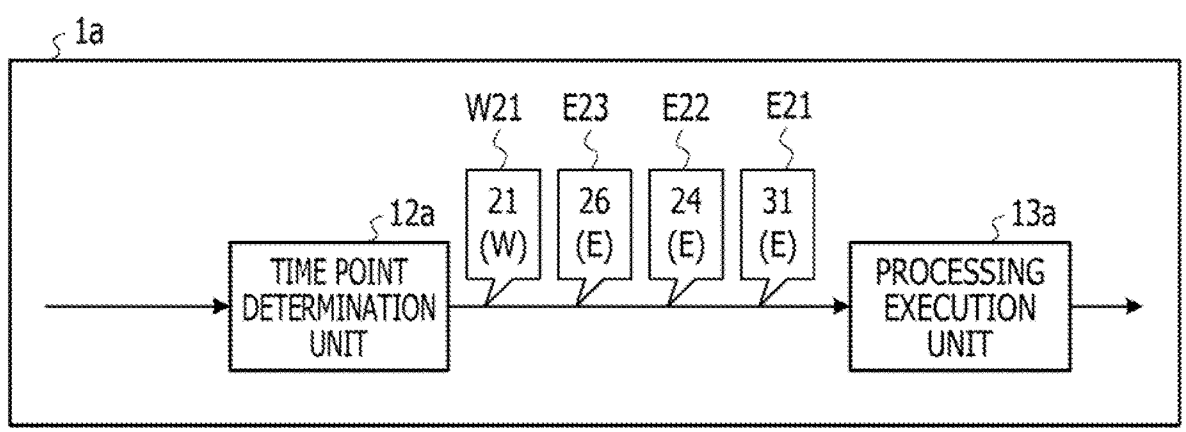
FIG. 6 is a diagram illustrating an outline of processing in the time point determination unit.

Then, as illustrated in FIG. 6, for example, after sending the event message E21, the event message E22, and the event message E23 to the processing execution unit 13*a*, the time point determination unit 12*a* sends a control message W21 with a timestamp "21 sec" to the processing execution unit 13*a*.

When the processing execution unit 13*a* receives the control message W21 with the timestamp "21 sec" from the time point determination unit 12*a*, the time point determination unit 12*a* performs processing for event messages with timestamps earlier than "21 sec" (for example, the event message E11 and the event message E12 described with reference to FIG. 3 and so on) among event messages stored in the buffer.

Figure 7:
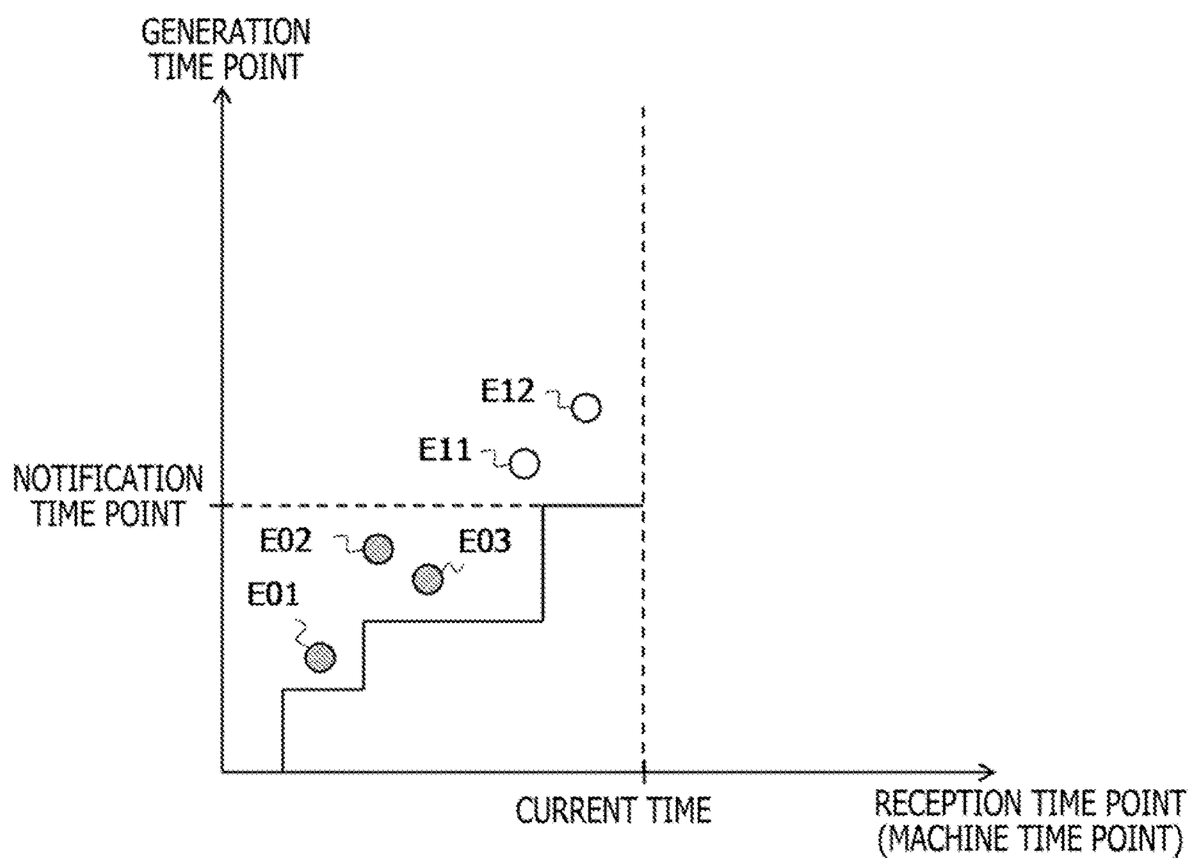
FIG. 7 is a diagram illustrating an outline of processing in the time point determination unit.

For example, in the case where the processing execution unit 13*a* receives the control message W11 with the timestamp "8 sec", as illustrated in FIG. 7, the processing execution unit 13*a* performs processing for event messages E01, E02, and E03 with timestamps earlier than "8 sec" (the event messages corresponding to hatched circles) among the event messages E01, E02, E03, E11, and E12 stored in the buffer.

Figure 8:
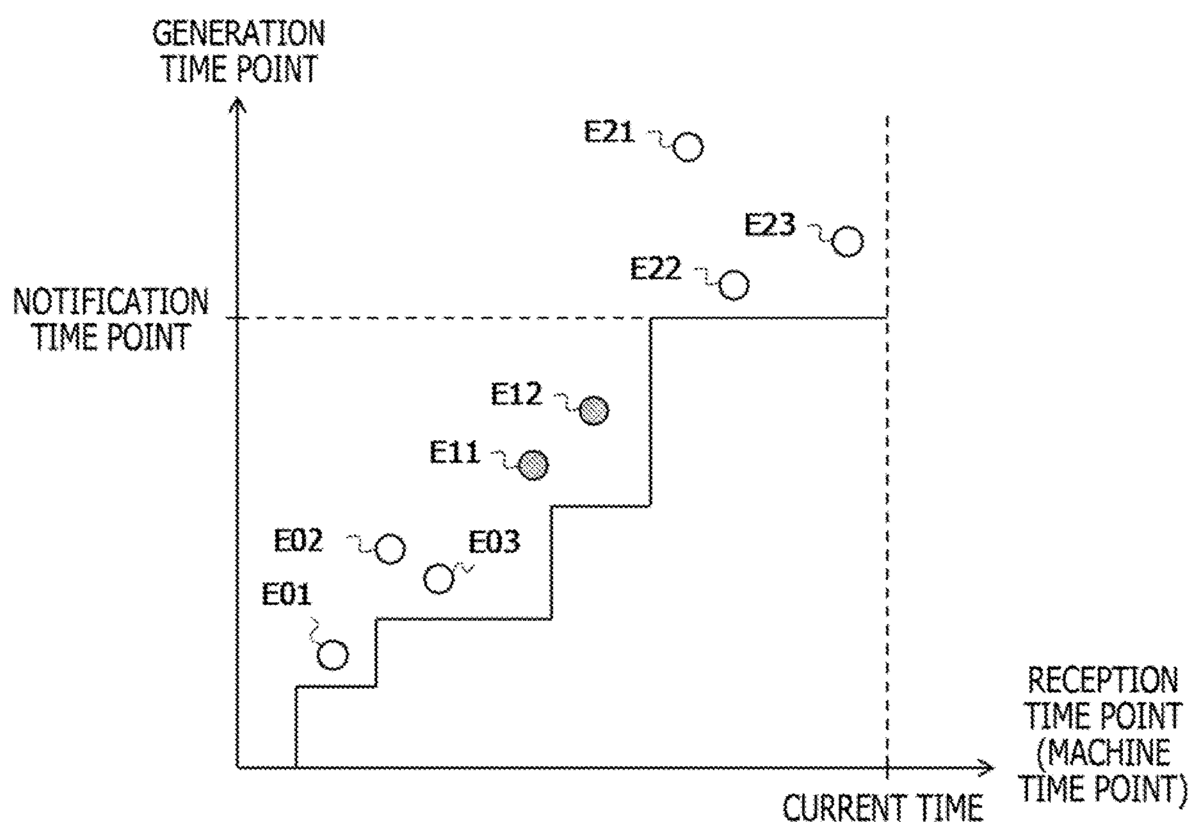
FIG. 8 is a diagram illustrating an outline of processing in the time point determination unit.

Then, for example, in the case where the processing execution unit 13*a* receives the control message W21 with the timestamp "21 sec", as illustrated in FIG. 8, the processing execution unit 13*a* performs processing for the event messages E11 and E12 with timestamps earlier than "21 sec" (the event messages corresponding to hatched circles) among the event messages E11, E12, E21, E22, and E23 stored in the buffer.

This enables the information processing system 10 to cause the generation order of event messages in the IoT devices 3 to match the processing order of the event messages in the processing execution unit 13 even when there is an event message that is delayed in arriving because of a network delay or the like.

Setting the margin time mentioned above to a long time enables processing in the information processing system 10 to be performed more in accordance with the generation order of event messages, while increasing the possibility that the processing completion time will be delayed. In contrast, setting the margin time to a short time enables the delay in the processing completion time in the information processing system 10 to be reduced, while increasing the possibility that the generation order of event messages will differ from the processing order of the event messages. Therefore, it may be hard for the entity to determine a suitable margin time.

In the information processing system 10, the delay time of an event message largely varies depending on a situation in which delay has occurred in a network, whether a failure has occurred, and so on. It is therefore desirable that such a margin time as described above be determined as occasion arises in accordance with, for example, a situation in which a delay has occurred in a network (the state of arrival of an event message).

Therefore, the information processing apparatus 1 generates a regression line (hereafter also referred to as a first regression line) indicating a correlation between the reception time point of each of a plurality of event messages received in a certain time period (hereafter also referred to as a first time period) and the generation time point of each of the plurality of event messages.

The information processing apparatus 1 calculates, for each plurality of event messages, a difference (hereafter also referred to as a first difference) between the generation time point of each event message and a value on the first regression line corresponding to the reception time point of each event message.

The information processing apparatus 1 then determines, based on a margin time in accordance with the calculated first difference, a timestamp (hereafter also referred to as a notification time point) to be added to a control message indicating the communication state of the plurality of event messages.

For example, the information processing apparatus 1 in the present embodiment determines a margin time in accordance with the communication state (for example, a network delay state) in the first time period by using the first regression line indicating a correlation between the reception time point in the information processing apparatus 1 and the generation time point in the IoT device 3 for each event message received in the first time period.

A large variation in the first difference means an unstable communication state during the time and a high probability that a message will arrive much later than expected. Conversely, a small variation in the first difference means a stable communication state during the time and a low probability that a message will arrive much later than expected. In view of such circumstances, in the present embodiment, the margin time is controlled to be longer when the variation in the first difference is large than when the variation in the first difference is small, enabling a suitable margin time in accordance with a communication state to be determined.

[Hardware Configuration of Information Processing System]

Figure 9:
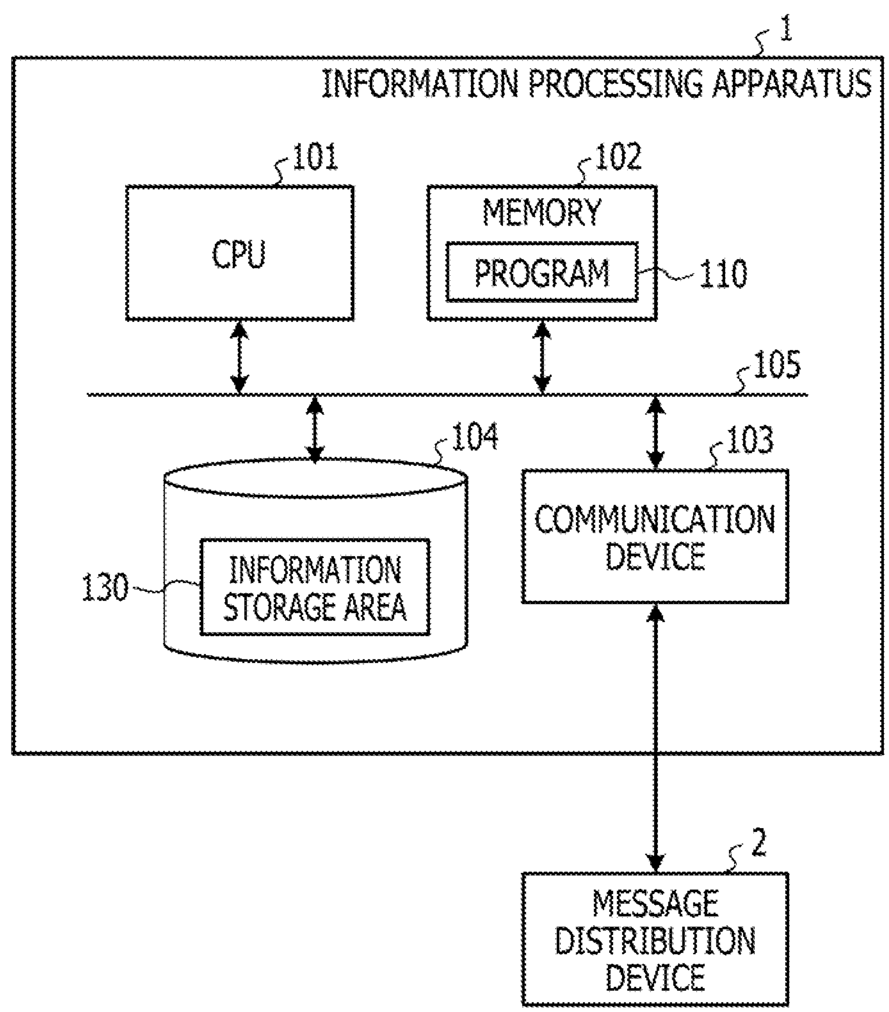
FIG. 9 is a diagram illustrating a hardware configuration of the information processing apparatus.

The hardware configuration of the information processing system will now be described. FIG. 9 is a diagram illustrating a hardware configuration of the information processing apparatus 1.

As illustrated in FIG. 9, the information processing apparatus 1 includes a central processing unit (CPU) 101, which is a processor, a memory 102, a communication device 103, and a storage medium 104. The components are coupled to each other via a bus 105.

The storage medium 104 includes, for example, a program storage area (not illustrated) in which a program 110 for performing a process of controlling execution of an event message sent from the IoT device 3 (hereafter also referred to as an execution control process) is stored. The storage medium 104 also includes, for example, an information storage area 130 that stores information used in performing the execution control process. The storage medium 104 may be, for example, a hard disk drive (HDD) or a solid-state drive (SSD). Description will be given below assuming that the information storage area 130 includes information storage areas respectively corresponding to a first storage unit and a second storage unit.

The CPU 101 executes the program 110 loaded from the storage medium 104 into the memory 102 to perform the execution control process.

The communication device 103, for example, communicates with the message distribution device 2 via a network.

[Functions of Information Processing System]

Figure 10:
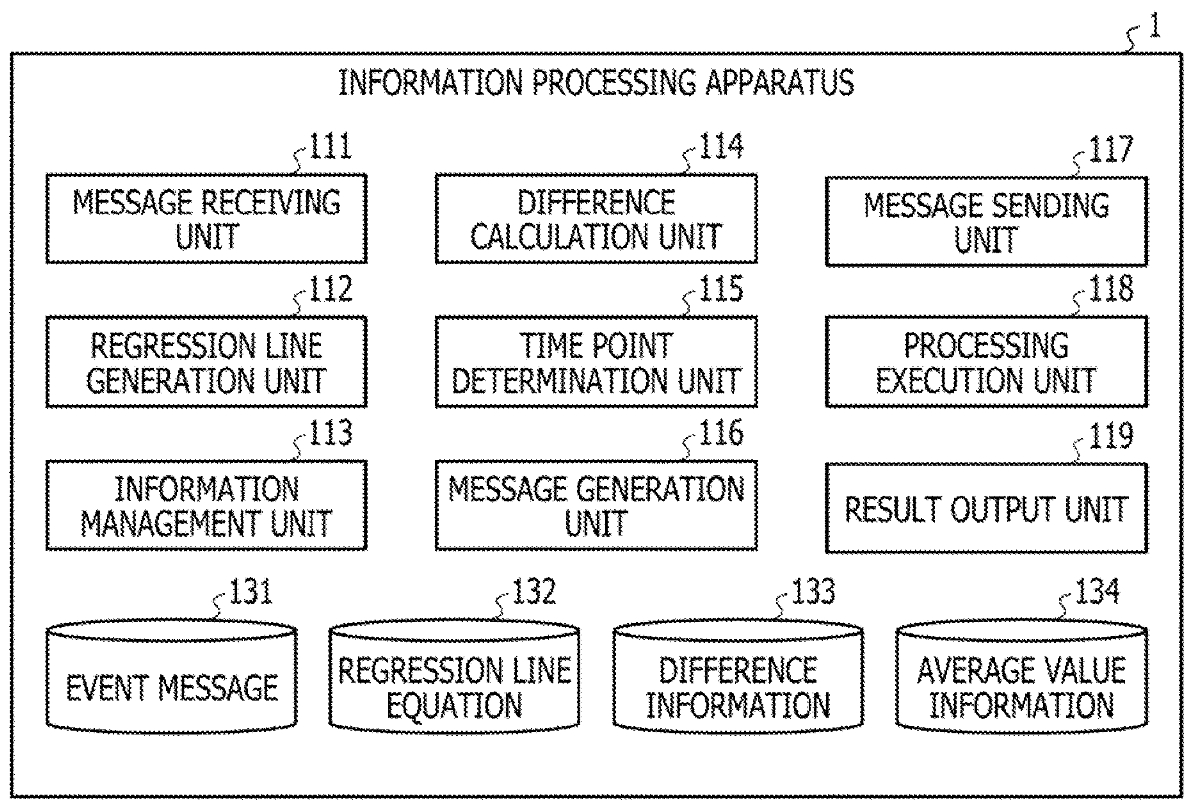
FIG. 10 is a block diagram of functions of the information processing apparatus.

The functions of the Information processing system 10 will now be described. FIG. 10 is a block diagram of functions of the information processing apparatus 1.

In the information processing apparatus 1, as illustrated in FIG. 10, for example, hardware, such as the CPU 101 and the memory 102, and the program 110 cooperate systematically, so that various functions including a message receiving unit 111, a regression line generation unit 112, an information management unit 113, a difference calculation unit 114, a time point determination unit 115, a message generation unit 116, a message sending unit 117, a processing execution unit 118, and a result output unit 119 are implemented.

For example, as illustrated in FIG. 10, the information processing apparatus 1 stores an event message 131, a regression line equation 132, difference information 133, and average value information 134 in the information storage area 130.

The message receiving unit 111 is a function corresponding to the receiving unit 11 described with reference to, for example, FIG. 2, the processing execution unit 118 is a function corresponding to the processing execution unit 13 described with reference to, for example, FIG. 2, and the result output unit 119 is a function corresponding to the result output unit 14 described with reference to, for example, FIG. 2. The regression line generation unit 112, the information management unit 113, the difference calculation unit 114, the time point determination unit 115, the message generation unit 116, and the message sending unit 117 are functions corresponding to the time point determination unit 12 described with reference to, for example, FIG. 2.

The message receiving unit 111 receives the event message 131 sent from the message distribution device 2 and stores this event message 131 in the information storage area 130.

The regression line generation unit 112 generates the regression line equation 132 indicating a correlation between the reception time point and the generation time point of each of a plurality of event messages 131 received in the certain time period. The information management unit 113 stores the regression line equation 132 generated by the regression line generation unit 112 in the information storage area 130.

The difference calculation unit 114 calculates, for each plurality of event messages 131 received in the certain time period, the difference information 133 indicating a difference between the generation time point of each event message 131 and a value on the regression line equation 132 corresponding to the reception time point of each event message 131. The information management unit 113 stores the difference information 133 generated by the difference calculation unit 114 in the information storage area 130.

The time point determination unit 115 determines a margin time in accordance with the difference information 133 calculated by the difference calculation unit 114. Based on the determined margin time, the time point determination unit 115 determines a notification time point (hereafter also referred to simply as a timestamp) to be added to a control message, which indicates the communication state of the plurality of event messages 131 received in the certain time period.

The message generation unit 116 generates a control message with the notification time point determined as a timestamp by the time point determination unit 115. For example, the message generation unit 116 generates a watermark with the notification time point determined by the time point determination unit 115 as a timestamp.

The message sending unit 117 sends the event message 131 received by the message receiving unit 111 to the processing execution unit 118 corresponding to this event message 131. For example, the message sending unit 117 references attribute information included in the event message 131 received by the message receiving unit 111 and sends the event message 131 to the processing execution unit 118 corresponding to the event message 131. The message sending unit 117 also sends a control message generated by the message generation unit 116 to each processing execution unit 118.

The processing execution unit 118 performs various types of processing for the event message 131 sent from the message sending unit 117.

The result output unit 119, for example, outputs results of processing for the event messages 131 performed by the processing execution unit 118 to an output device (not illustrated). A specific example of the average value information 134 will be described later.

[Outline of First Embodiment]

Figure 11:
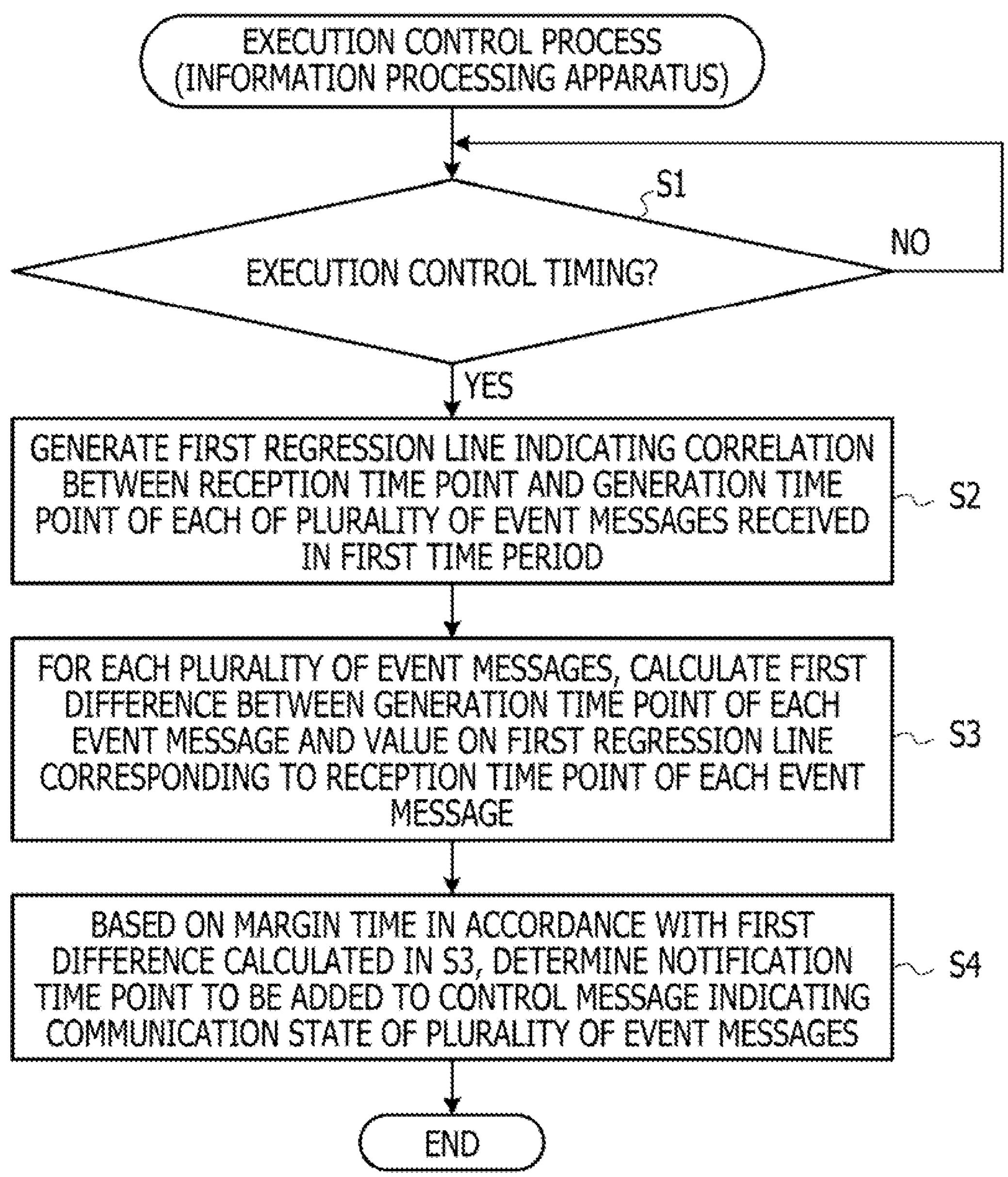
FIG. 11 is a flowchart illustrating an outline of an execution control process in a first embodiment.

The outline of a first embodiment will now be described. FIG. 11 is a flowchart illustrating the outline of the execution control process in the first embodiment.

As illustrated in FIG. 11, the information processing apparatus 1 waits until an execution control timing comes (NO in S11). The execution control timing may be, for example, a periodic timing such as every one second. The execution control timing may be, for example, a timing that comes each time a certain number (for example, 1000) of event messages 131 are received from the message distribution device 2.

If the execution control timing has come (YES in S11), the information processing apparatus 1 generates the first regression line indicating a correlation between the reception time point and the generation time point of each of a plurality of event messages 131 received in the first time period (S2).

Subsequently, the information processing apparatus 1 calculates, for each plurality of event messages 131 received in the first time period, a first difference between the generation time point of each event message 131 and a value on the first regression line corresponding to the reception time point of each event message 131 (S3).

Based on a margin time in accordance with the first difference calculated in S3, the information processing apparatus 1 then determines a notification time point to be added to a control message indicating the communication state of the plurality of event messages 131 received in the first time period (S4).

For example, the information processing apparatus 1 in the present embodiment determines a margin time in accordance with the communication state (for example, a network delay state) in the first time period by using the first regression line indicating a correlation between the reception time point of each event message 131 received in the first time period in the information processing apparatus 1 and the generation time point of the event message 131 in the IoT device 3.

Thus, the information processing apparatus 1 may perform processing based on the margin time determined in accordance with the communication state.

For example, for the case where the delay time period of the event message 131 is small, the information processing apparatus 1 may set the margin time to a short time. In this case, the information processing apparatus 1 may therefore reduce a delay in the processing completion time for each event message 131.

In contrast, for example, for the case where the delay time period of the event message 131 is large, the information processing apparatus 1 may set the margin time to a long time. In this case, the information processing apparatus 1 may therefore perform processing for each event message 131 in accordance with the generation order of the event messages 131.

[Details of First Embodiment]

Details of the first embodiment will now be described. FIG. 12 to FIG. 15 are flowcharts illustrating details of the execution control process in the first embodiment. FIG. 16 to FIG. 21 are diagrams depicting details of the execution control process in the first embodiment.

[Message Receiving Process]

Figure 12:
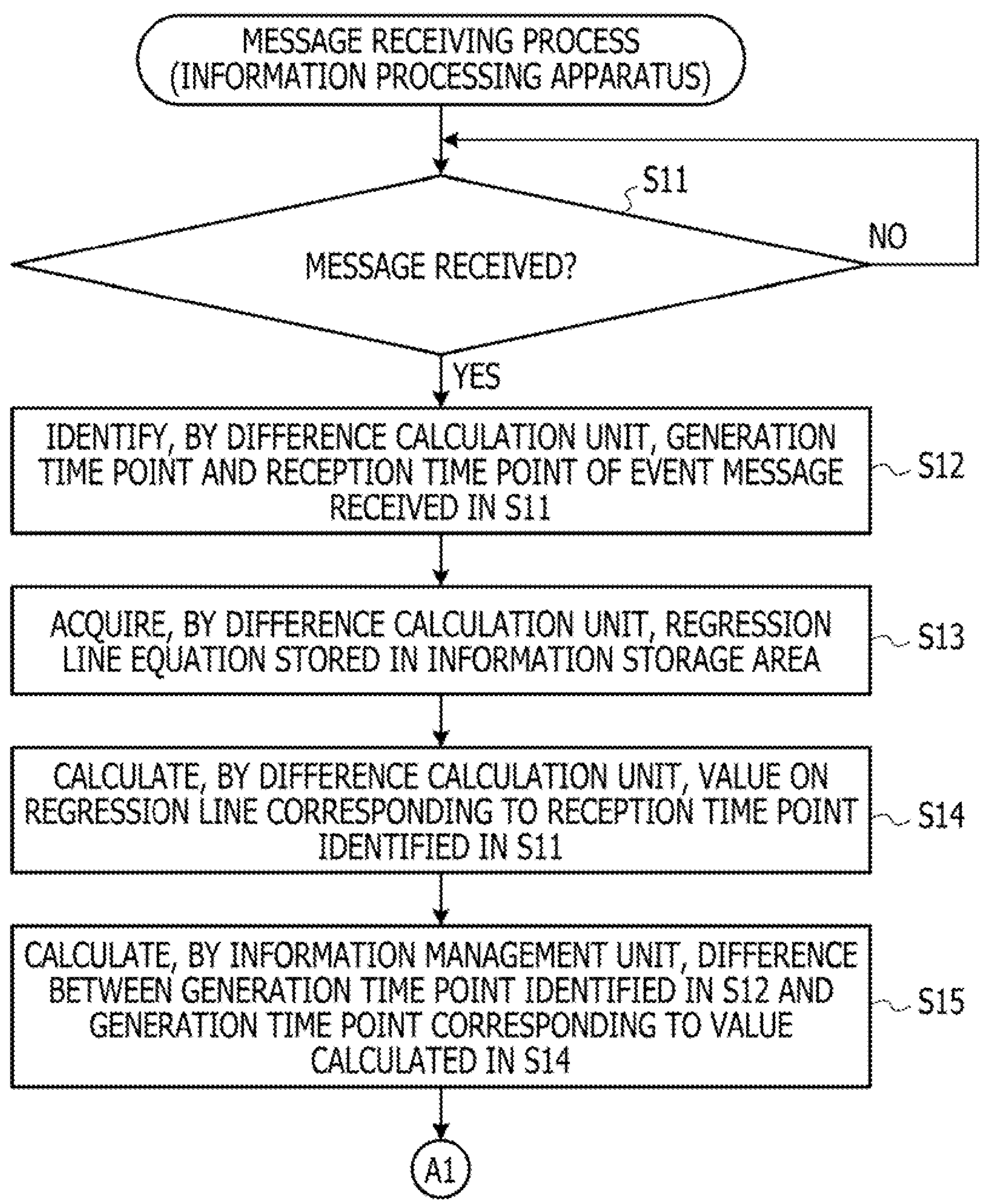
FIG. 12 is a flowchart illustrating details of the execution control process in the first embodiment.

In the execution control process, first, a process that is performed when the event message 131 is received (hereafter also referred to as a message receiving process) will be described. FIG. 12 is a flowchart illustrating the message receiving process.

As illustrated in FIG. 12, the message receiving unit 111 of the information processing apparatus 1 waits until the message receiving unit 111 receives the event message 131 sent from the message distribution device 2 (NO in S11).

If the event message 131 sent from the message distribution device 2 is received (YES in S11), the difference calculation unit 114 of the information processing apparatus 1 identifies the generation time point and the reception time point of the event message received in S11 (S12).

For example, the difference calculation unit 114 identifies, as the generation time point, a time point indicated by a timestamp included in the event message 131 received in S11 (a time point at which the event message 131 received in S11 was generated in the IoT device 3). The difference calculation unit 114 identifies, as a reception time point, a time point at which the event message 131 received in S11 was received by the message receiving unit 111.

A combination of the generation time point and the reception time point identified in S12 is, for example, expressed by expression (1).

$$(t_e^n, t_a^n) \quad \text{Expression (1)}$$

In the above expression (1), $t_e^n$ denotes the generation time point of the event message 131 received in an nth interval, and $t_a^n$ denotes the reception time point of the event message 131 received in the nth interval.

Subsequently, the difference calculation unit 114 acquires the regression line equation 132 stored in the information storage area 130 (S13). Hereafter, a regression line corresponding to the regression line equation 132 acquired in S13 will also be referred to as a second regression line.

For example, the difference calculation unit 114 acquires the regression line equation 132 corresponding to a regression line calculated in S36 (described later).

The regression line equation 132 acquired in S13 is, for example, expressed by expression (2).

$$t_e = at_m + b \quad \text{Expression (2)}$$

In the above expression (2), $t_e$ denotes the generation time point of the event message 131, $t_m$ denotes a machine time in the information processing apparatus 1, a denotes the slope of the regression line equation 132, and b denotes the Y-intercept of the regression line equation 132.

Next, the difference calculation unit 114 calculates a value on a regression line corresponding to the reception time point identified in S12 (a second regression line corresponding to the regression line equation 132 acquired in S13) (S14).

For example, the difference calculation unit 114 calculates a value on the regression line corresponding to the reception time point identified in S12 according to the following expression (3).

$$t_{calc}^n = at_a^n + b \quad \text{Expression (3)}$$

In the above expression (3), $t_{calc}^n$ denotes a value on the regression line corresponding to the reception time point of the event message 131 received in the nth interval.

Figure 16:
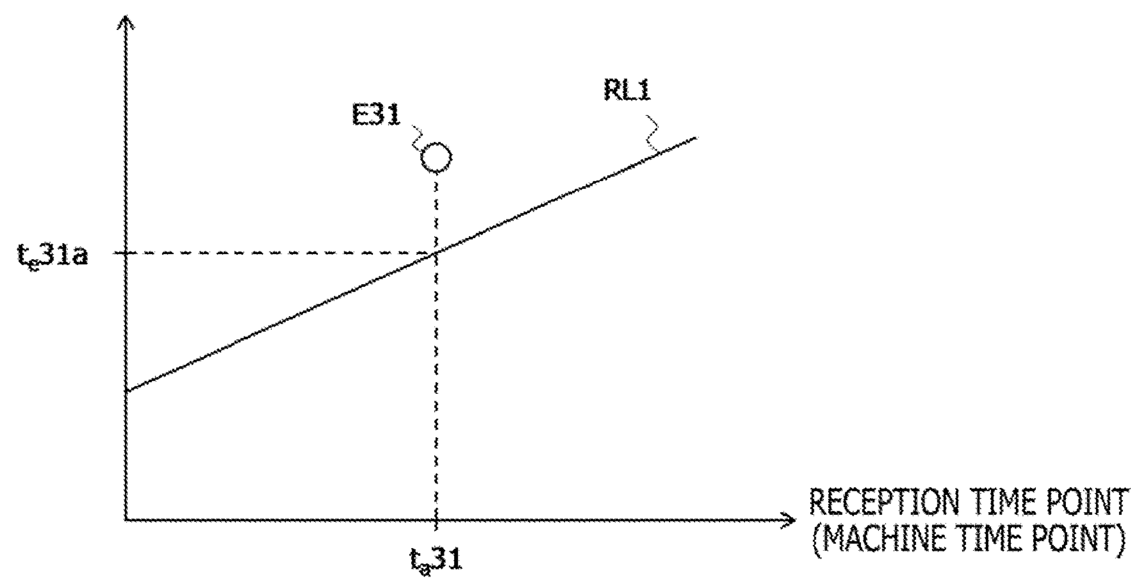
FIG. 16 is a diagram depicting details of the execution control process in the first embodiment.

For example, as depicted in FIG. 16, the difference calculation unit 114 identifies a generation time point $t_e$31*a* corresponding to a reception time point $t_a$31 of an event message E31 received in S11 by using a regression line RL1.

The difference calculation unit 114 calculates a difference (hereafter also referred to as a second difference) between a generation time point identified in S12 and the generation time point corresponding to the value calculated in S14 (S15).

For example, the difference calculation unit 114 calculates a difference between the generation time point identified in S12 and the generation time point corresponding to the value calculated in S14, according to the following expression (4).

$$dt^n = t_{calc}^n - t_e^n \quad \text{Expression (4)}$$

In the above expression (4), $dt^n$ denotes a difference between the generation time point of the event message 131 received in the nth interval and the value on the regression line corresponding to the reception time point of the event message 131 received in the nth interval.

Figure 17:
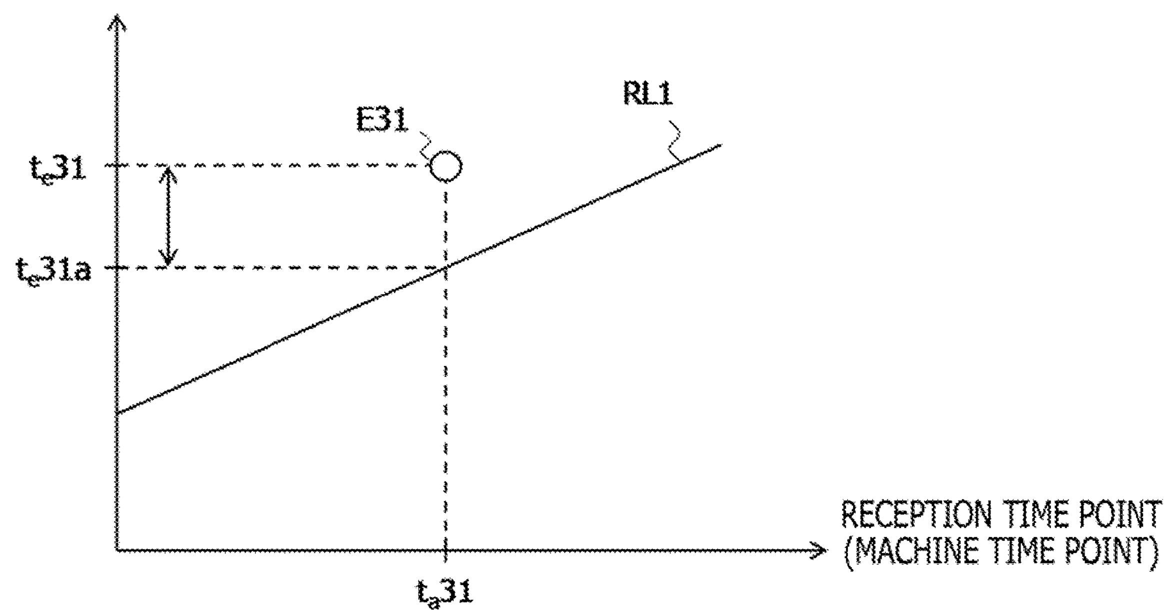
FIG. 17 is a diagram depicting details of the execution control process in the first embodiment.

For example, as depicted in FIG. 17, the difference calculation unit 114 calculates a difference between the generation time point $t_e$31 of the event message E31 received in S11 and the generation time point $t_e$31*a* identified in the example illustrated in FIG. 16.

Figure 13:
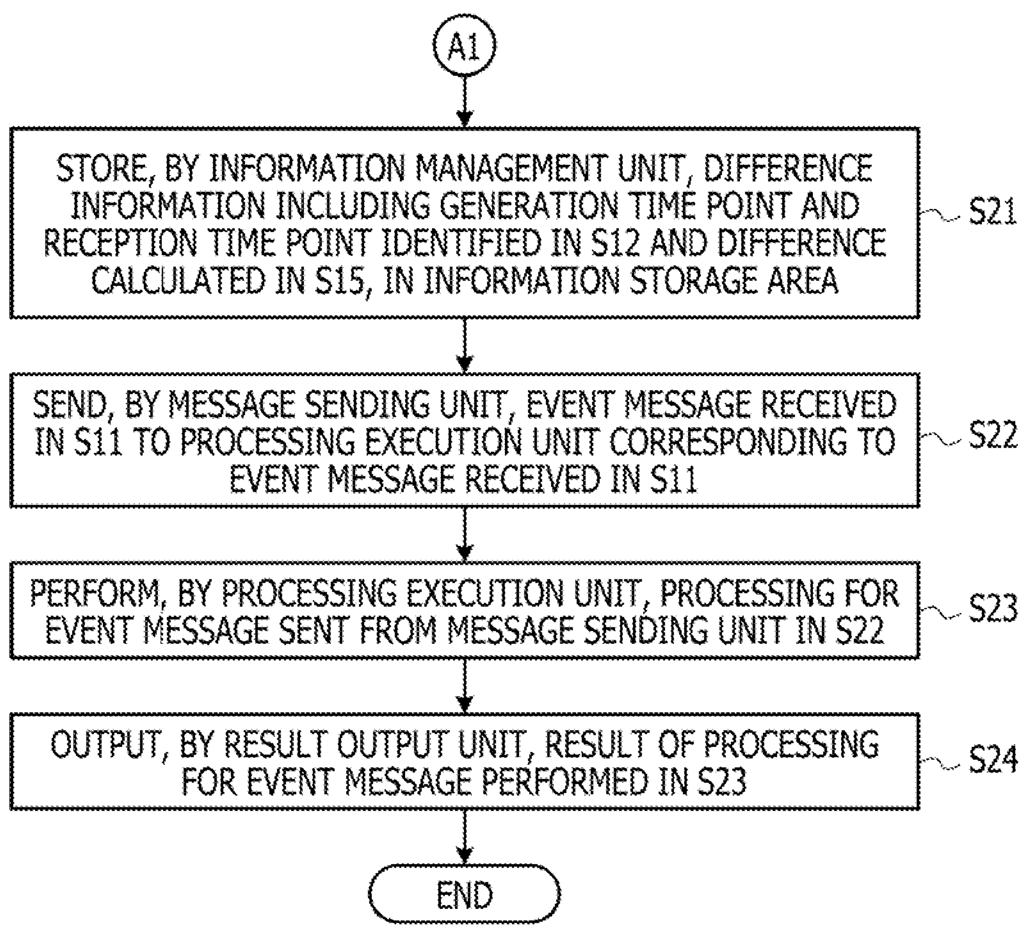
FIG. 13 is a flowchart illustrating details of the execution control process in the first embodiment.

Then, as illustrated in FIG. 13, the information management unit 113 of the information processing apparatus 1 stores the difference information 133, which includes the generation time point and the reception time point identified in S12 and the difference calculated in S15, in the information storage area 130 (S21).

Each piece of information included in the difference information 133 is, for example, expressed by expression (5).

$$(t_e^n, t_a^n, dt^n) \quad \text{Expression (5)}$$

A specific example of the difference information 133 will be described below.

[Specific Example of Difference Information]

FIG. 18 is a diagram depicting a specific example of the difference information 133. For example, the difference information 133 in FIG. 18 is a table depicting a specific example of the difference information 133 corresponding to the event messages 131 received in the nth interval.

The difference information 133 depicted in FIG. 18 includes, as items, "NO." for identifying each piece of information included in the difference information 133, "GENERATION TIME POINT" in which the generation time point of each event message 131 is set, "RECEPTION TIME POINT" in which the reception time point of each event message 131 is set, and "DIFFERENCE" in which a difference of each event message 131 (a difference calculated in S15) is set.

For example, in the difference information 133 depicted in FIG. 18, for information with "1" in "NO.", "GENERATION TIME POINT" is set as "11:59:00", "RECEPTION TIME POINT" is set as "11:59:05", and "DIFFERENCE (SEC)" is set as "1".

In the difference information 133 depicted in FIG. 18, for information with "2" in "NO.", "GENERATION TIME POINT" is set as "11:59:01", "RECEPTION TIME POINT" is set as "11:59:04", and "DIFFERENCE (SEC)" is set as "−1".

In the difference information 133 depicted in FIG. 18, for information with "3" in "NO.", "GENERATION TIME POINT" is set as "11:59:01", "RECEPTION TIME POINT" is set as "11:59:09", and "DIFFERENCE (SEC)" is set as "4". Description of the other pieces of information included in FIG. 18 is omitted.

Referring back to FIG. 13, the message sending unit 117 of the information processing apparatus 1 sends the event message 131 received in S11 to the processing execution unit 118 corresponding to the event message 131 received in S11 (S22).

The processing execution unit 118 of the information processing apparatus 1 performs processing for the event message 131 sent by the message sending unit 117 in S22 (S23).

For example, as described later, in response to receiving a control message from the message sending unit 117, the processing execution unit 118 performs processing for one or more event messages 131 each with a timestamp prior to the received control message, among the event messages 131 that have been received from the message sending unit 117 and have not been processed.

Then, the result output unit 119 of the information processing apparatus 1 outputs a result of processing for the event message 131 performed by the processing execution unit 118 in S23 (S24).

For example, the result output unit 119 outputs the result of processing to an output device (not illustrated).

For the case where the processing execution units 118 operate in different information processing apparatuses 1 to which the event messages 131 to send, S23 and S24 may be performed in the information processing apparatus 1 different from the information processing apparatus 1 that has performed S11 to S22 as described with reference to FIG. 2.

[Time Point Determination Process]

In the execution control process, next, a process of determining a notification time point (hereafter also referred to as a time point determination process) will be described.

Figure 14:
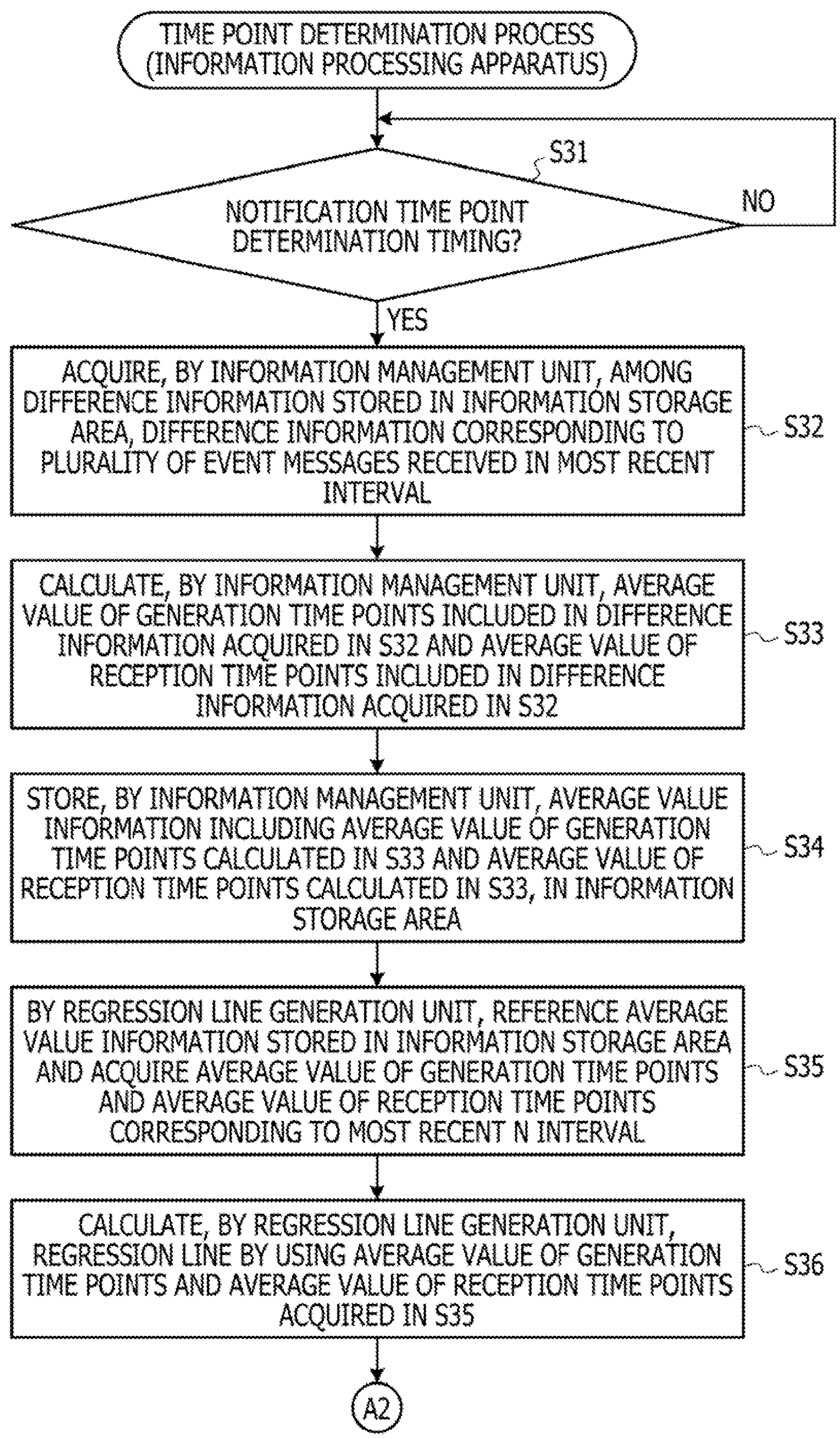
FIG. 14 is a flowchart illustrating details of the execution control process in the first embodiment.

As illustrated in FIG. 14, the information management unit 113 of the information processing apparatus 1 waits until a time point determination timing comes (NO in S31).

If the time point determination timing has come (YES in S31), the information management unit 113 acquires, among the difference information 133 stored in the information storage area 130, the difference information 133 corresponding to a plurality of event messages 131 received in the most recent interval (S32).

For example, the information management unit 113 acquires the difference information 133 corresponding to a plurality of event messages 131 received after the last time point determination timing.

In the case where the difference information 133 stored in the information storage area 130 is only the difference information 133 corresponding to the most recent interval, the information management unit 113 acquires all of the difference information 133 stored in the information storage area 130.

Subsequently, the information management unit 113 calculates each of an average value of the generation time points included in the difference information 133 acquired in S32 and an average value of the reception time points included in the difference information 133 acquired in S32 (S33).

For example, when the difference information 133 corresponding to a plurality of event messages 131 received in the most recent interval is the difference information 133 described with reference to FIG. 18, the information management unit 113 calculates each of an average value of the time points set in "GENERATION TIME POINT" of the difference information 133 described with reference to FIG. 18 and an average value of the time points set in "RECEPTION TIME POINT".

Then, the information management unit 113 stores the average value information 134, which includes the average value of the generation time points calculated in S33 and the average value of the reception time points calculated in S33, in the information storage area 130 (S34).

For example, the information management unit 113 stores the average value information 134 generated at each time the time point determination timing has come, in the information storage area 130. A specific example of the average value information 134 will be described below.

[Specific Example of Average Value Information]

FIG. 19 is a diagram depicting a specific example of the average value information 134. For example, the average value information 134 in FIG. 19 is a table depicting a specific example of the average value information 134 (the average value information 134 corresponding to each of a plurality of intervals) stored in the information storage area 130.

The average value information 134 depicted in FIG. 19 includes, as items, "NO." for identifying each piece of information included in the average value information 134, "GENERATION TIME POINT" in which an average value of the generation time points of the event messages 131 generated in each interval is set, and "RECEPTION TIME POINT" in which an average value of the reception time points of the event messages 131 generated in each interval is set.

For example, in the average value information 134 depicted in FIG. 19, for information with "1" in "NO.", "GENERATION TIME POINT" is set as "11:50:34", and "RECEPTION TIME POINT" is set as "11:50:35".

In the average value information 134 depicted in FIG. 19, for information with "2" in "NO.", "GENERATION TIME POINT" is set as "11:51:28", and "RECEPTION TIME POINT" is set as "11:51:31".

In the average value information 134 depicted in FIG. 19, for information with "3" in "NO.", "GENERATION TIME POINT" is set as "11:52:34", and "RECEPTION TIME POINT" is set as "11:52:32". Description of the other pieces of information included in FIG. 19 is omitted.

Referring back to FIG. 14, the regression line generation unit 112 of the information processing apparatus 1 references the average value information 134 stored in the information storage area 130 and acquires the average values of the generation time points and the average values of the reception time points corresponding to the most recent N intervals (S35). Here, N is an integer greater than or equal to 2.

The regression line generation unit 112 calculates a regression line by using the average values of the generation time points and the average values of the reception time points acquired in S35 (S36).

Figure 20:
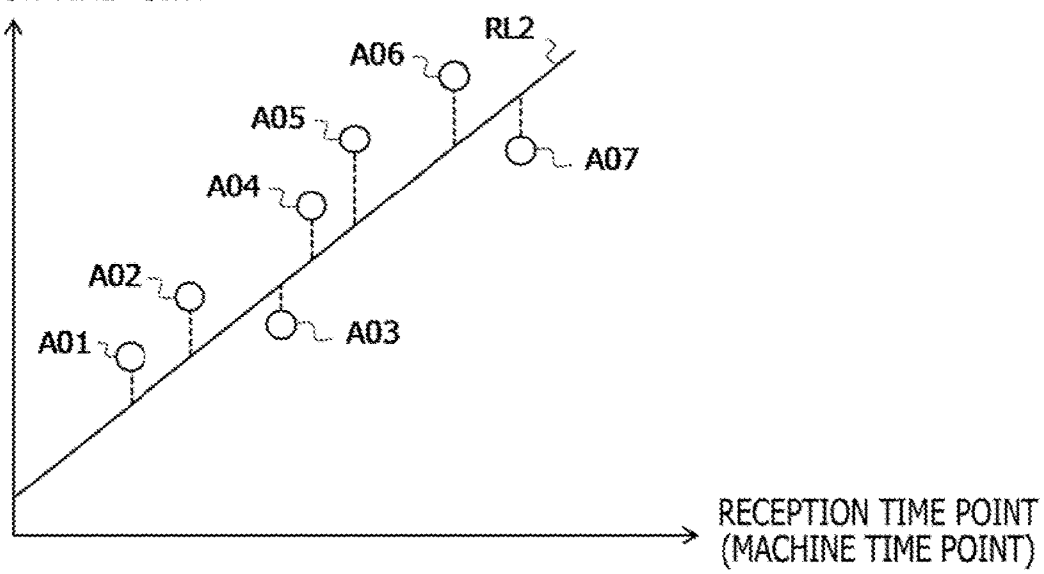
FIG. 20 is a diagram depicting details of the execution control process in the first embodiment.

For example, as depicted in FIG. 20, the regression line generation unit 112 generates a regression line RL2 corresponding to average values A01 to A07 acquired in S35 by using the method of least squares.

Figure 15:
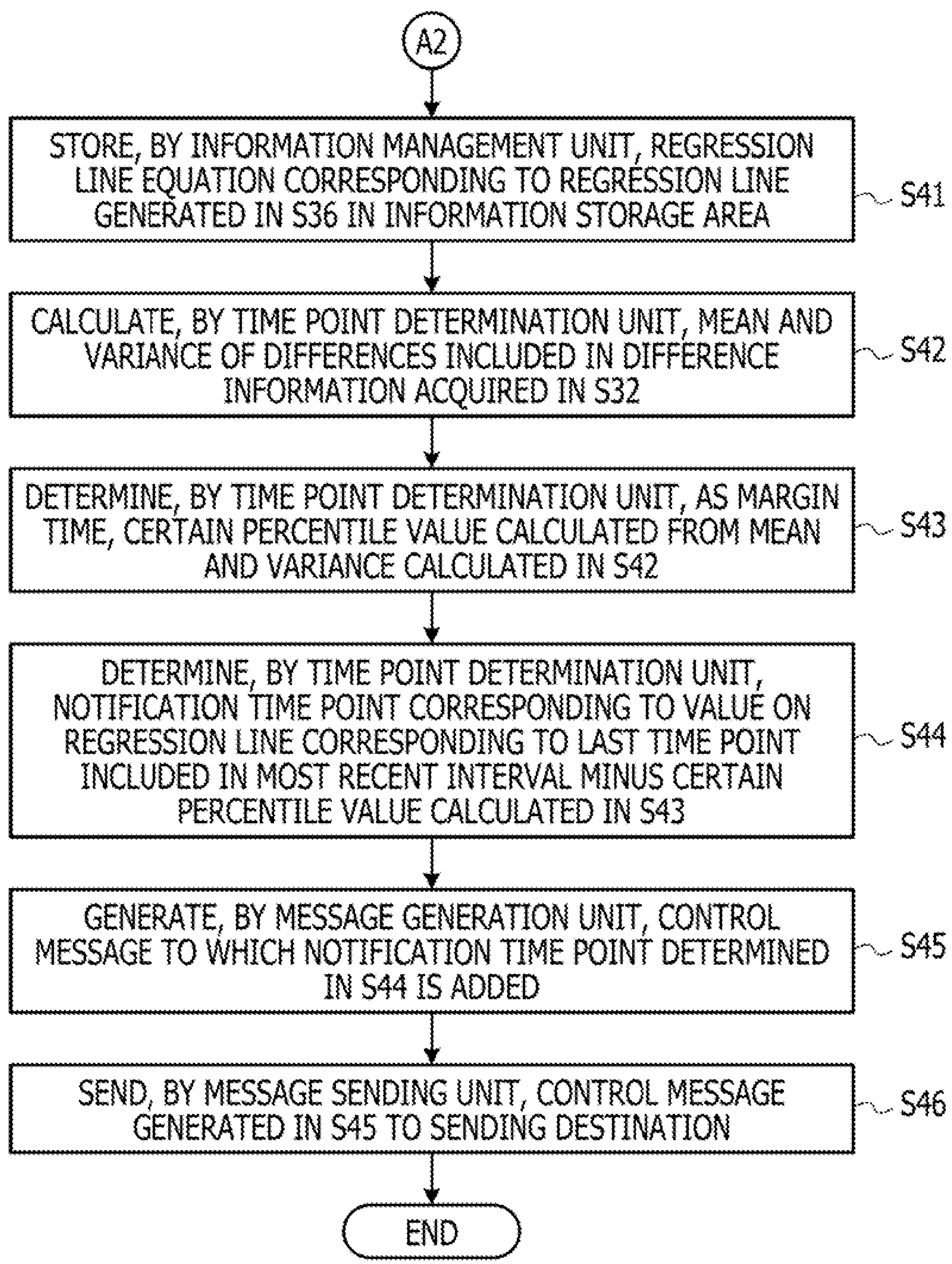
FIG. 15 is a flowchart illustrating details of the execution control process in the first embodiment.

Then, as illustrated in FIG. 15, the information management unit 113 stores the regression line equation 132 corresponding to the regression line generated in S36 in the Information storage area 130 (S41).

Subsequently, the time point determination unit 115 of the information processing apparatus 1 calculates the mean and variance of the differences included in the difference information 133 acquired in S32 (S42).

The time point determination unit 115 determines, as the margin time, a certain percentile value calculated from the mean and variance calculated in S42 (S43).

Figure 21:
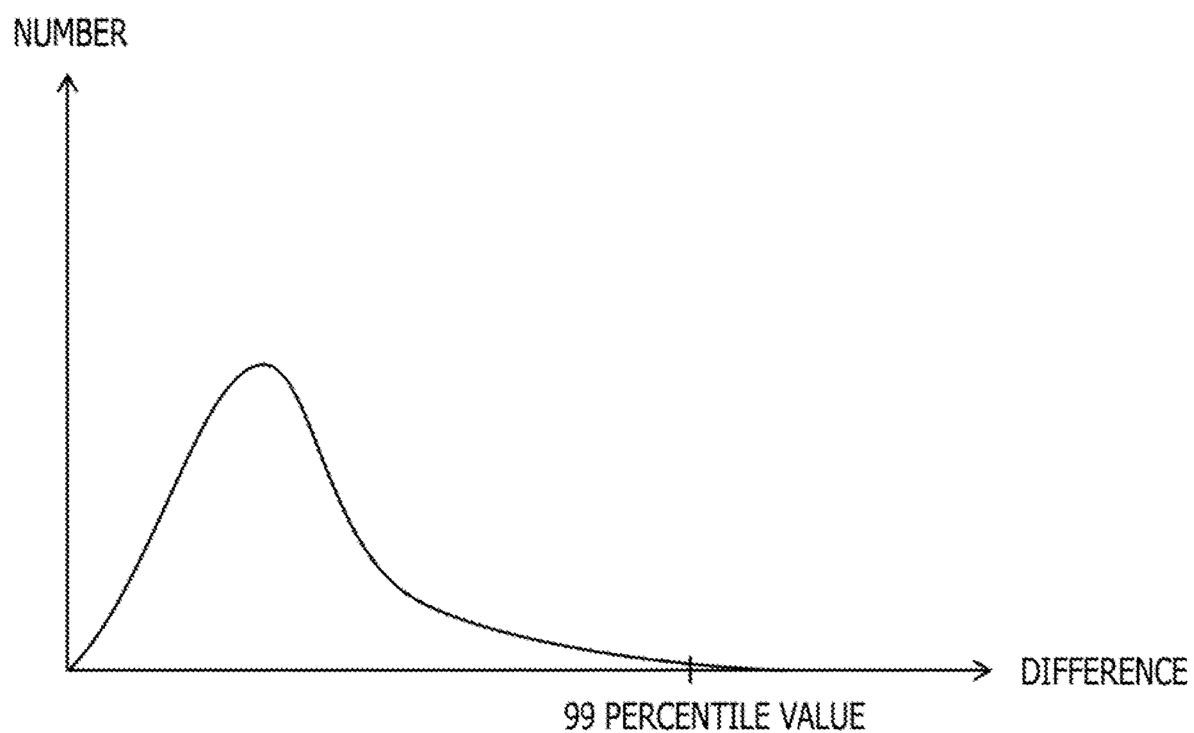
FIG. 21 is a diagram depicting details of the execution control process in the first embodiment.

For example, as depicted in FIG. 21, when the certain percentile value is a 99 percentile value, the time point determination unit 115 calculates the 99 percentile value according to the following expression (6).

$$\mu+2.58\sigma \quad \text{Expression (6)}$$

The time point determination unit 115 determines a notification time point that corresponds to a value on a regression line corresponding to the last time point Included in the most recent Interval (a regression line corresponding to the regression line equation 132 stored in the information storage area 130) minus the certain percentile value calculated in S43 (S44).

For example, the time point determination unit 115 determines the notification time point (the timestamp of a watermark) according to the following expression (7).

$$\text{New watermark}=(aT_i+b)-(\mu+2.58\sigma) \quad \text{Expression 7}$$

In the above expression (7), $T_i$ denotes the last time point included in the most recent interval.

Then, the message generation unit 116 of the information processing apparatus 1 generates a control message (watermark) to which the timestamp determined in S44 is added (S45).

The message sending unit 117 sends the control message generated in S45 to each of the subsequent processing execution units 118 (including the processing execution unit 118 in another information processing apparatus 1) (S46).

This enables the processing execution unit 118, which has received the control message, to perform processing for one or more event message 131 each with a timestamp prior to the timestamp of the received control message, among the event messages 131 that have been received from the message sending unit 117 and have not been processed.

Therefore, the information processing apparatus 1 may perform processing without failing to obtain event messages 131 generated in the IoT devices 3.

In S42, the time point determination unit 115 may calculate, for example, a certain percentage of confidence interval for a population mean (for example, a 99% confidence interval for the population mean) for differences included in the difference information 133 acquired in S32 and the certain percentage of confidence interval for a population variance (for example, a 99% confidence interval for the population variance) for differences included in the difference information 133 acquired in S32.

In S43, the time point determination unit 115 may identify, as the margin time, the certain percentile value in a normal distribution corresponding to a certain mean (for example, an upper limit value of the mean) included in the certain percentage of confidence interval for the population mean calculated in S42 and a certain variance (for example, a variance value of the mean) included in the certain percentage of confidence interval for the population variance calculated in S42.

This enables the time point determination unit 115 to calculate a margin time accurately, for example, even when the number of differences (the number of samples) included in the difference information 133 acquired in S32 is small.

In this way, the information processing apparatus 1 in the present embodiment generates the first regression line indicating a correlation between the reception time point of each of a plurality of event messages 131 received in the first time period and the generation time point of each of the plurality of event messages 131.

The information processing apparatus 1 calculates, for each plurality of event messages 131, the first difference between the generation time point of each event message 131 and a value on the first regression line corresponding to the reception time point of each event message 131.

The information processing apparatus 1 then determines, based on a margin time in accordance with the calculated first difference, a timestamp (a notification time point) to be added to a control message indicating the communication state of the plurality of event messages 131.

For example, the information processing apparatus 1 in the present embodiment determines a margin time in accordance with the communication state (for example, a network delay state) in the first time period by using the first regression line indicating a correlation between the reception time point in the information processing apparatus 1 and the generation time point in the IoT device 3 for each event message received in the first time period.

Thus, the information processing apparatus 1 may perform processing based on the margin time determined in accordance with the communication state.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An execution control method that causes a computer to execute a process, the process comprising:
- generating a first regression line that indicates a correlation between a reception time point of each of a plurality of event messages received in a first time period and a generation time point of each of the plurality of event messages;
- calculating, for each of the plurality of the event messages, a first difference between the generation time point of each event message and a value on the first regression line corresponding to the reception time point of each event message; and
- determining, based on a margin time in accordance with the calculated first difference, a notification time point to be added to a control message indicating a communication state of the plurality of event messages.

2. The execution control method according to claim 1, the process further comprising:
- in response to a reception of any event message included in the plurality of event messages, referencing a first storage and identifying a second regression line generated from the plurality of event messages received in a second time period prior to the first time period;
- calculating a second difference between the generation time point of the any event message and a value on the second regression line corresponding to the reception time point of the any event message; and
- storing the second difference in a second storage, and
- wherein the calculating the first difference includes identifying, for each of the plurality of the event messages received in the first time period, the second difference stored in the second storage as the first difference.

3. The execution control method according to claim 2, the process further comprising:
- generating the second regression line that indicates a correlation between a reception time point of each of the plurality of event messages received in the second time period and a generation time point of each of the plurality of event messages received in the second time period; and
- storing the second regression line in the first storage.

4. The execution control method according to claim 2, wherein the second time period is a time period immediately prior to the first time period.

5. The execution control method according to claim 1, wherein the generating the first regression line incudes generating, as the first regression line, a regression line that includes a correlation between a reception time point of each of the plurality of event messages received in a plurality of time periods that includes the first time period and a generation time point of each of the plurality of event messages received in the plurality of time periods.

6. The execution control method according to claim 5, wherein the generating the first regression line includes:
- calculating, for each plurality of the time periods, a first average value for a reception time point of each of the plurality of event messages received in each time period and a second average value for a generation time point of each of the plurality of event messages received in each time period, and
- generating, as the first regression line, a regression line that indicates a correlation between the first average value corresponding to each of the plurality of time periods and the second average value corresponding to each of the plurality of time periods.

7. The execution control method according to claim 1, wherein the determining the notification time point includes:
- identifying, as the margin time, a predetermined percentile value in a distribution for the first difference, and
- determining, as the notification time point, a time point corresponding to a value obtained by subtracting the margin time from a value on the first regression line corresponding to a last time point included in the first time period.

8. The execution control method according to claim 7, wherein the determining the notification time point includes:

calculating a predetermined percentage of a first confidence interval for a population mean for the first difference and the predetermined percentage of a second confidence interval for a population variance for the first difference, and identifying, as the margin time, the predetermined percentile value in a distribution corresponding to a predetermined mean included in the first confidence interval and a predetermined variance included in the second confidence interval.

9. The execution control method according to claim 8, wherein the determining the notification time point includes identifying, as the margin time, the certain percentile value in a normal distribution corresponding to a mean of upper limit values in the first confidence interval and a variance of the upper limit values in the second confidence interval.

10. The execution control method according to claim 1, wherein the notification time point is information that indicates completion of receipt of an event message in the computer, the generation time point of the event message being prior to the notification time point.

11. The execution control method according to claim 1, wherein the control message is a watermark.

12. An information processing apparatus comprising:

a memory; and a processor coupled to the memory and configured to:

generate a first regression line that indicates a correlation between a reception time point of each of a plurality of event messages received in a first time period and a generation time point of each of the plurality of event messages;

calculate, for each plurality of the event messages, a first difference between the generation time point of each event message and a value on the first regression line corresponding to the reception time point of each event message; and determine, based on a margin time in accordance with the calculated first difference, a notification time point to be added to a control message indicating a communication state of the plurality of event messages.

13. The information processing apparatus according to claim 12, wherein the processor is configured to generate, as the first regression line, a regression line that includes a correlation between a reception time point of each of the plurality of event messages received in a plurality of time periods that includes the first time period and a generation time point of each of the plurality of event messages received in the plurality of time periods.

14. A non-transitory computer-readable recording medium having stored therein a learning program that causes a computer to execute a process, the process comprising:

generating a first regression line that indicates a correlation between a reception time point of each of a plurality of event messages received in a first time period and a generation time point of each of the plurality of event messages;

calculating, for each plurality of the event messages, a first difference between the generation time point of each event message and a value on the first regression line corresponding to the reception time point of each event message; and determining, based on a margin time in accordance with the calculated first difference, a notification time point to be added to a control message indicating a communication state of the plurality of event messages.

15. The non-transitory computer-readable recording medium according to claim 14, wherein the generating the first regression line includes generating, as the first regression line, a regression line that includes a correlation between a reception time point of each of the plurality of event messages received in a plurality of time periods that includes the first time period and a generation time point of each of the plurality of event messages received in the plurality of time periods.

* * * * *